United States Patent [19]

Bell, Jr. et al.

[11] 4,152,569

[45] May 1, 1979

[54] SERVO FEED CIRCUIT FOR ELECTRICAL DISCHARGE MACHINING APPARATUS

[75] Inventors: Oliver A. Bell, Jr., Statesville; Randall C. Gilleland, Troutman; Davey J. Chance, Concord, all of N.C.

[73] Assignee: Colt Industries Operating Corp., New York, N.Y.

[21] Appl. No.: 796,689

[22] Filed: May 13, 1977

[51] Int. Cl.² .............................................. B23P 1/08
[52] U.S. Cl. ................... 219/69 G; 318/624
[58] Field of Search ............... 219/69 G, 69 V, 69 R, 219/69 M, 69 C; 318/624, 619

[56] References Cited

U.S. PATENT DOCUMENTS

| Re. 25,580 | 5/1964 | Webb | 219/69 G |
|---|---|---|---|
| 2,939,065 | 5/1960 | Matulaitis | 219/69 G |
| 3,727,024 | 4/1973 | Bell | 219/69 G |
| 3,887,782 | 6/1975 | Wohlabaugh | 219/69 C |
| 4,055,777 | 10/1977 | Black | 307/265 |

Primary Examiner—Bruce A. Reynolds
Attorney, Agent, or Firm—Harry R. Dumont

[57] ABSTRACT

A servo feed system for EDM in which feed of the electrode is controlled responsive to a gap voltage signal with appropriate feedback changes to control servo velocity and upfeed and downfeed gain as the gap voltage level changes. A further feature involves the imposition of a dither circuit between the gap voltage signal amplifier and the servo valve coil in such manner as to continuously apply dither in a manner independent of changes in gap voltage.

6 Claims, 1 Drawing Figure

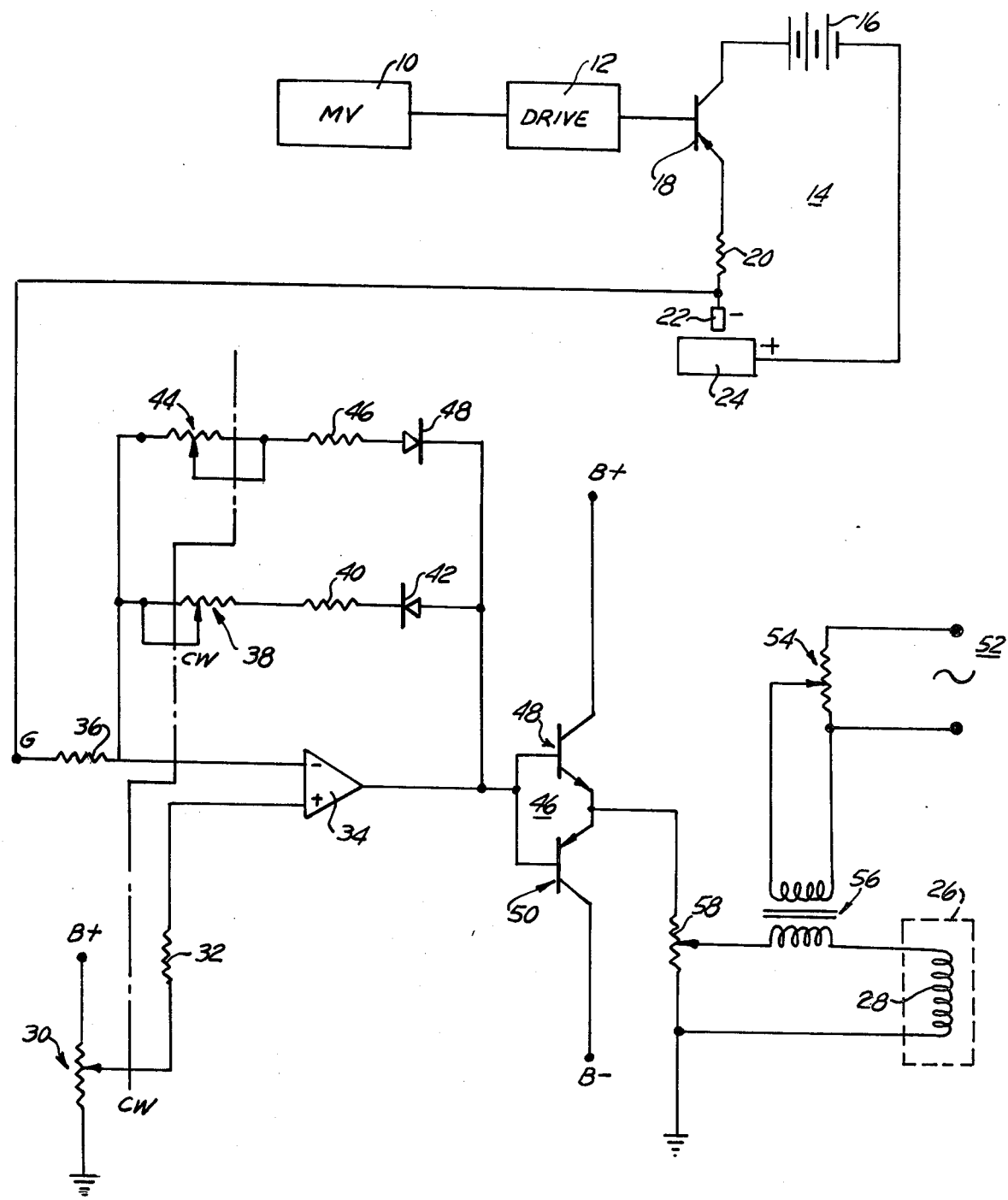

SERVO FEED CIRCUIT FOR ELECTRICAL DISCHARGE MACHINING APPARATUS

BACKGROUND OF THE INVENTION

The electrical discharge machining art has advanced from the early stages in which relaxation oscillators were used to provide machining power pulses to the gap for eroding portions of an electrically conductive workpiece in the pattern of a tool electrode. Independently timed and controlled pulse generators are now almost universally used and in these generators the electronic switches employed are now generally in the form of solid state switches, particularly transistors. During the electrical discharge machining process, it is necessary as the workpiece material is removed that a predetermined gap be maintained between the tool electrodes and the workpiece through an automatic servo feed system which provides a continuous advance into and toward the workpiece as material removal progresses. During the electrical discharge machining process, a fluid coolant, generally a liquid, is circulated through the machining gap to flush the workpiece particles from the gap. The coolant is usually furnished under pressure by a pump to one or more holes provided in the electrode. One necessary and defining characteristic of electrical discharge machining is that the coolant is a dielectric fluid such as kerosene, transformer oil, distilled water, or the like. The dielectric fluid is broken down in minute, localized areas by the action of the machining power pulses passed between the closely opposed surfaces of the tool electrode and workpiece.

For control of the servo feed system, there is generally utilized an electrical signal from the machining gap in order to control the rate and the direction of servo feed. In most cases, the gap signal is compared to an adjustable reference voltage so that the operator can select the rate of servo feed desired for the particular operating condition. It will thus be seen that with respect to the servo feed of the gap elements in electrical discharge machining, a parameter of the gap, whether the average gap voltage as shown and described in Williams U.S. Pat No. 2,841,686, issued July 1, 1958, or a peak gap voltage as shown and described in Webb U.S. Pat No. RE. 25,542, issued Mar. 24, 1964, must be sensed and applied as a control signal for an electrical or electro-hydraulic drive motor. In the present invention, the inventive circuit is incorporated in a servo control system of this electro-hydraulic type.

By way of summary, it will be seen that the present inventive circuit receives a voltage signal from the machining gap itself which signal represents a changing condition and actuates a servo feed circuit to initiate a servo feed backup operation to protect the gap elements from possible damage when gap voltage drops to a predetermined level and initiates a servo feed downfeed operation when gap voltage rises to a predetermined level.

The circuit according to the present invention likewise includes a novel arrangement of an AC dither circuit which is so located in series with the servo valve coil that AC pulses are passed to the servo valve directly with a constant presettable amplitude without being affected by the magnitude of the signal from the gap which, of course, is constantly changing in magnitude as machining progresses.

It will be understood in the specification that when I refer to "electronic switch" I mean any electronic control device having two or more electrodes comprising at least two principal or power conducting electrodes acting to control current flow in the power circuit, the conductivity between the principal electrodes being controlled by a control electrode within the switch whereby the conductivity of the power circuit is controlled statically or electrically without movement of mechanical elements within the switch. Included within this definition are transistors in which turn-on is accomplished by a control voltage applied to the transistor control electrode and in which turn-off is accomplished automatically in response to removal of that control voltage. Also included in the definition are devices of the gate type in which turn-on is accomplished by a control voltage applied to the control electrode, which control voltage may be then removed and in which turn-off is accomplished by the application of a subsequent control voltage to the control electrode. An additional class of electrical switches called electronic trigger devices falls within this definition and includes ignitrons, thyratrons, semiconductor control rectifiers, and the like. By "electronic trigger device", I mean any electronic switch of the type which is triggered on at its control electrode by a pulse and is turned off by a reverse voltage applied for sufficient time across its principal electrodes.

BRIEF DESCRIPTION OF THE DRAWING

The present invention, its operational features and advantages, and the advancement which it affords will be understood from the following specification, together with the drawing which is a combined schematic and block diagramatic showing of the invention and the EDM power supply in which it is incorporated.

DETAILED DESCRIPTION OF THE PREFERRED EMBODIMENT

The basic electrical discharge machining power supply circuit includes a multivibrator 10, a drive stage 12, and a gap circuit 14. Included in the gap circuit 14 is a main machining power DC source 16, an output transistor 18, a series current limiting transistor 20, and the two machining gap elements. The gap elements include a tool electrode 22 and a workpiece 24 connected with the electrode 22 negative in polarity relative to the workpiece 24. The servo control circuit is shown in the lower half of the drawing and receives at its left-hand side an input at terminal G from the gap which input represents gap voltage.

In the present instance, the servo feed system for providing relative movement between the tool electrode 22 and the workpiece 24 is of the electrohydraulic type including a servo valve 26 and a servo valve control coil 28. The detail of the hydraulic system is well known to those skilled in the art and will not be repeated. It will be understood that the servo system upfeed or downfeed and velocity depend on the direction and magnitude of current flow through the servo coil 28. The servo control potentiometer 30 is located at the left-hand side of the drawing and a resistor 32 is connected in series with the movable slider of the potentiometer 30. The reference voltage preset on the potentiometer 30 provides an input to an operational amplifier and comparator 34 at its lower positive terminal. A resistor 36 is connected in series between the gap voltage input G and the input to the upper negative terminal of the comparator 34. The comparator 34 is further shunted by a pair of potentiometer, resistor, diode networks. The lower of the networks includes a potentiometer 38, series resistor 40 and diode 42 poled as shown. The upper of the two networks includes a potentiometer 44, series resistor 46, and a diode 48 oppositely poled with respect to the diode 42. It will further be understood that the three potentiometers 30, 38, and 44 are all mounted on a common shaft so that rotation for example of the lowermost servo voltage control potentiometer 30 in a clockwise direction will rotate both the above potentiometers 38 and 44 in a clockwise direction. The servo feed system further includes a signal amplifier stage comprising a push-pull amplifier 46. The push-pull amplifier 46 includes an upper NPN transistor 48 and a lower PNP transistor 50 connected as shown. A pair of positive and negative DC voltage sources are connected in circuit and are indicated by the legends B+ and B−.

The dither portion of the circuit is shown at the right-hand of the drawing and includes a source of AC operating potential 52, a voltage adjusting potentiometer 54 connected across the source 52, and a filamentary transformer 56 of the step-down type. An additional potentiometer 58 has its secondary winding included in circuit as shown to adjust the magnitude of current flow to the servo coil 28.

DESCRIPTION OF OPERATION

The servo voltage potentiometer 30 is initially adjusted until stable cutting and normal downfeed is occurring. The gap voltage signal at terminal G, however, will vary as the cavity in the workpiece 24 becomes larger and the opposed gap surfaces of electrodes and workpiece change in area. Also the gap may become bridged by eroded particles from the workpiece. The comparator 34 is an operational amplifier and has connected across it the two shunt networks which control its feedback. The output of the comparator 34 will be either greater or less than the voltage drop across the diodes 42, 48 since current flow must occur across one of the shunt networks to provide feedback.

When the gap voltage approaches ground, it is desirable to increase backup gain and to reduce downfeed gain. Because of the ganged arrangement of the three potentiometers 30, 38 and 44, adjustment of the servo potentiometer 30 will correspondingly decrease the series resistance of the potentiometer 44 in the upper shunt feedback line and increase the backup gain. At the same time, the series resistance of the potentiometer 38 in the lower shunt feedback line will be increased and this will decrease the downfeed gain. In the opposite condition where gap open circuit is occurring, the potentiometer 30 would be adjusted clockwise and this would adjust the series resistance of the potentiometers 44 and 38 such as to decrease backup gain and increase downfeed gain.

The gap voltage is thus being amplified and used to control the servo feed velocity and direction as well as the gain in both directions. When EDM fine finishing operation is being performed, it will be seen that the velocity and the gain to the signal being supplied to the servo coil 28 will drop appreciably. At this time it is important that dither be provided to the servo to continuously vibrate the electrode 22 and improve flushing of the coolant from the gap. This is achieved by the connection of an AC waveform in the circuit in series with the servo coil 28 through the transformer 56. This insures that the dither will be constant in amplitude and independent of servo gain and fine finishing will result.

It will thus be seen that we have provided by our invention a novel and improved servo feed circuit for electrical discharge machining.

We claim:

1. A servo feed system for an electrical discharge machining apparatus for providing relative movement by a motive means between a tool electrode and an electrically conductive workpiece across a dielectric filled gap, comprising:

means connected to the gap for sensing gap voltage and providing a signal representative thereof;

a reference voltage source and a potentiometer coupled to said source for adjusting the magnitude of said reference voltage;

an operational amplifier having one input connected to said signal and the other input connected to said reference voltage potentiometer slider;

an electrically energized element for controlling the operation of said motive means responsive to direction and magnitude of current flow through said element;

a second amplifier connected intermediate the output of said operational amplifier and said element;

a pair of oppositely phased, unidirectional current conducting shunt networks connected across said operational amplifier, each of said networks including a variable impedance for separately controlling downfeed and upfeed gain of said system, each of said networks comprising a variable resistor and a diode series connected in said network, such diodes being oppositely phased one relative to the other, said variable resistor in each network comprising the variable resistor of a potentiometer, the slider of each of said potentiometers associated with said shunt networks being operated in common by the slider of said reference voltage potentiometer.

2. The combination as set forth in claim 1 wherein said electrically energized element comprises the servo coil of an electrohydraulic valve and said motive means comprises a hydraulic motor operated by said valve.

3. The combination as set forth in claim 1 wherein the sliders of said potentiometers in said two shunt networks are each oppositely connected relative to the ends of its variable resistor such that conjoint movement of the two potentiometers reduces the series resistance in one network and at the same time decreases the series resistance in the other network whereby backup and downfeed gain are correspondingly adjusted.

4. The combination as set forth in claim 3 wherein said second amplifier comprises an amplifier of the push-pull type.

5. The combination as set forth in claim 4 wherein said push-pull amplifier further comprises a PNP and a NPN transistor, each connected to a respective voltage source and coupled in a push-pull configuration.

6. The combination as set forth in claim 4 wherein a further variable impedance is connected in series between the output of said push-pull amplifier and said servo valve coil.

* * * * *